US007280899B2

(12) United States Patent
Cheng

(10) Patent No.: US 7,280,899 B2
(45) Date of Patent: Oct. 9, 2007

(54) S-TYPE SMOOTH COMMAND GENERATING METHOD AND MEANS THEREOF

(75) Inventor: Tsung-Hsin Cheng, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 53 days.

(21) Appl. No.: 10/919,277

(22) Filed: Aug. 17, 2004

(65) Prior Publication Data
US 2005/0222741 A1    Oct. 6, 2005

(30) Foreign Application Priority Data
Apr. 2, 2004    (TW) .............................. 93109233 A

(51) Int. Cl.
*G05B 19/21*    (2006.01)
(52) U.S. Cl. ......................................... 701/29; 318/569
(58) Field of Classification Search .................. 701/29; 318/569, 573, 636, 568.15, 560, 561, 568.18, 318/567; 477/68, 120
See application file for complete search history.

(56) References Cited

U.S. PATENT DOCUMENTS

| | | | | | |
|---|---|---|---|---|---|
| 3,941,214 | A | * | 3/1976 | Young et al. | 187/293 |
| 4,988,935 | A | * | 1/1991 | York | 318/568.18 |
| 5,057,756 | A | * | 10/1991 | Hara | 318/569 |
| 5,892,345 | A | * | 4/1999 | Olsen | 318/571 |
| 6,042,502 | A | * | 3/2000 | Cronin et al. | 477/68 |
| 6,539,275 | B1 | * | 3/2003 | Mizuno et al. | 700/170 |
| 6,552,507 | B2 | * | 4/2003 | Miyazawa | 318/568.11 |
| 6,873,490 | B2 | * | 3/2005 | Guo et al. | 360/78.07 |
| 6,961,628 | B2 | * | 11/2005 | Yutkowitz | 700/37 |

* cited by examiner

*Primary Examiner*—Dalena Tran

(57) ABSTRACT

An S-type smooth command generating method and the means thereof are provided to process the motion commands smoothly, thereby generating continuous velocity commands and position commands. The provided method not only improves the motor's ability of acceleration/deceleration, but also smoothes the operations in the mechanical structure of motor. Besides, in the position control mode, the position tracking of the servo system is enhanced and the steady error of the system is reduced.

9 Claims, 5 Drawing Sheets

S-TYPE SMOOTH COMMAND GENERATING METHOD AND MEANS THEREOF

This Nonprovisional application claims priority under 35 U.S.C. §119(a) on Patent Application No(s). 093109233 filed in Taiwan, Republic of China on Apr. 2, 2004, the entire contents of which are hereby incorporated by reference.

BACKGROUND OF THE INVENTION

1. Field of Invention

The invention relates to a an S-type smooth command generating method and, in particular, to an S-type smooth command generating method used in a servo module with a servo driver and motor.

2. Related Art

Because of abrupt changes in the input commands, the servo motor or servo module may have large jumps (proportional to the derivative of acceleration) during motion control. This results in vibrations and noises of the mechanical structure. This phenomenon is caused by the large instantaneous current from the servo module. Vibrations do not only affect the machining precision, the servo module lifetime will also be shortened after being exposed in such an operating environment for a long time.

The purpose of the S-type smooth commands is mainly to process motion commands smoothly during the operation of the motor. In reality, different control structures have been developed to satisfy constraints in different fields. For example, the motion controller uses a floating calculator with high-speed computing ability and high resolution to construct a complicated and complete command processing unit.

There are several methods to generate velocity smoothing commands. One method is to process the acceleration trapezoid curve using a low-pass filter, generating an approximately S-type smooth command. Another method is to average-filter the acceleration trapezoid curve for appropriate rectification, also generating an approximately S-type smooth command. A further method provides an S-type curve ratio that selects an appropriate output level according to needs. However, it is less flexible.

Generating S-type smooth commands encounters some technical problems to overcome. For example, in the analog velocity mode, the rotational velocity of the motor should remain fixed when the input voltage commands are the same. However, the rotational velocity changes with the adjustment in the acceleration/deceleration time.

SUMMARY OF THE INVENTION

In view of the foregoing, an objective of the invention is to provide an S-type smooth command generating method and means thereof to substantially abbreviate the foregoing problems.

To achieve the above objective, the disclosed velocity S-type smooth command method computes the basic increment of acceleration/deceleration and records acceleration basic increment or deceleration basic increment being used. Afterwards, the method checks whether the velocity command has reached the reference point of the velocity command, thereby computing the acceleration according to the status of the velocity command. Finally, the method generates a velocity S-type smooth command according to the velocity difference and the acceleration.

The disclosed position S-type smooth command method first defines time and position command reference point. It computes the acceleration using the acceleration or deceleration basic increment according to the time setting. The obtained acceleration is then used to compute the velocity. Finally, a position S-type smooth command is generated according to the velocity. Moreover, the method includes a step of status processing for the position S-type smooth command. The method refers to a maximal moving velocity to compute a velocity command reference point. When the position reaches the first position command reference point, a second position command reference point is computed according to the difference between a target value and the first position command reference point. When the position reaches the second position command reference point, the acceleration processing status is recorded.

To achieve the above objective, the disclosed velocity S-type smooth command generating means contains a device that computes an acceleration or deceleration basic increment according to a time setting; a device that records the acceleration or deceleration basic increment being used; a device that checks whether a velocity command has reached a velocity command reference point according to the basic increment; a device that computes the acceleration according to a velocity command status after the velocity command reaches the velocity command reference point; and a device that generates a velocity S-type smooth command according to the velocity difference of the velocity command and the acceleration.

The disclosed position S-type smooth command generating means includes a device that defines a plurality of position command reference points; a device that computes an acceleration/deceleration basic increment according to a time setting; a device that computers an acceleration according to the acceleration/deceleration basic increment; a device that computes the velocity according to the obtained acceleration; and a device that generates a position S-type command according to the velocity. In addition, the disclosed means also contains a status processing device that refers to a maximal moving velocity to compute a velocity command reference point; a device that computes a second position command reference point according to the difference between a target value and the first position reference point after the position reaches the first position command reference point; and a device that records the acceleration processing status when the position reaches the second position command reference point. Besides, the disclosed means also includes a device that performs a status processing on the position S-type smooth command.

According to the principle of the invention, the disclosed S-type smooth command generating method process motion command smoothly. The invention can generate continuous velocity and continuous acceleration with smaller jumps. This does not only improve the motor's acceleration/deceleration, but also smoothes the operations in the mechanical structure of motor. Besides, in the position control mode, the position tracking of the servo system is enhanced and the steady error of the system is reduced. The machining precision is also increased.

The invention provides a real, non-simplified analog velocity S-type smooth command generating means, a buffer velocity S-type smooth command generating means, and a buffer position S-type smooth command generating device used for fixed point calculators with low computing power and fewer bits.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

According to the invention, the S-type smooth command generating method adopts a symmetric structure. Using a velocity or position reference point, the invention determines whether a desired region has been reached. The velocity and acceleration curves are symmetric about their centers, ensuring their continuity.

Figure 1:
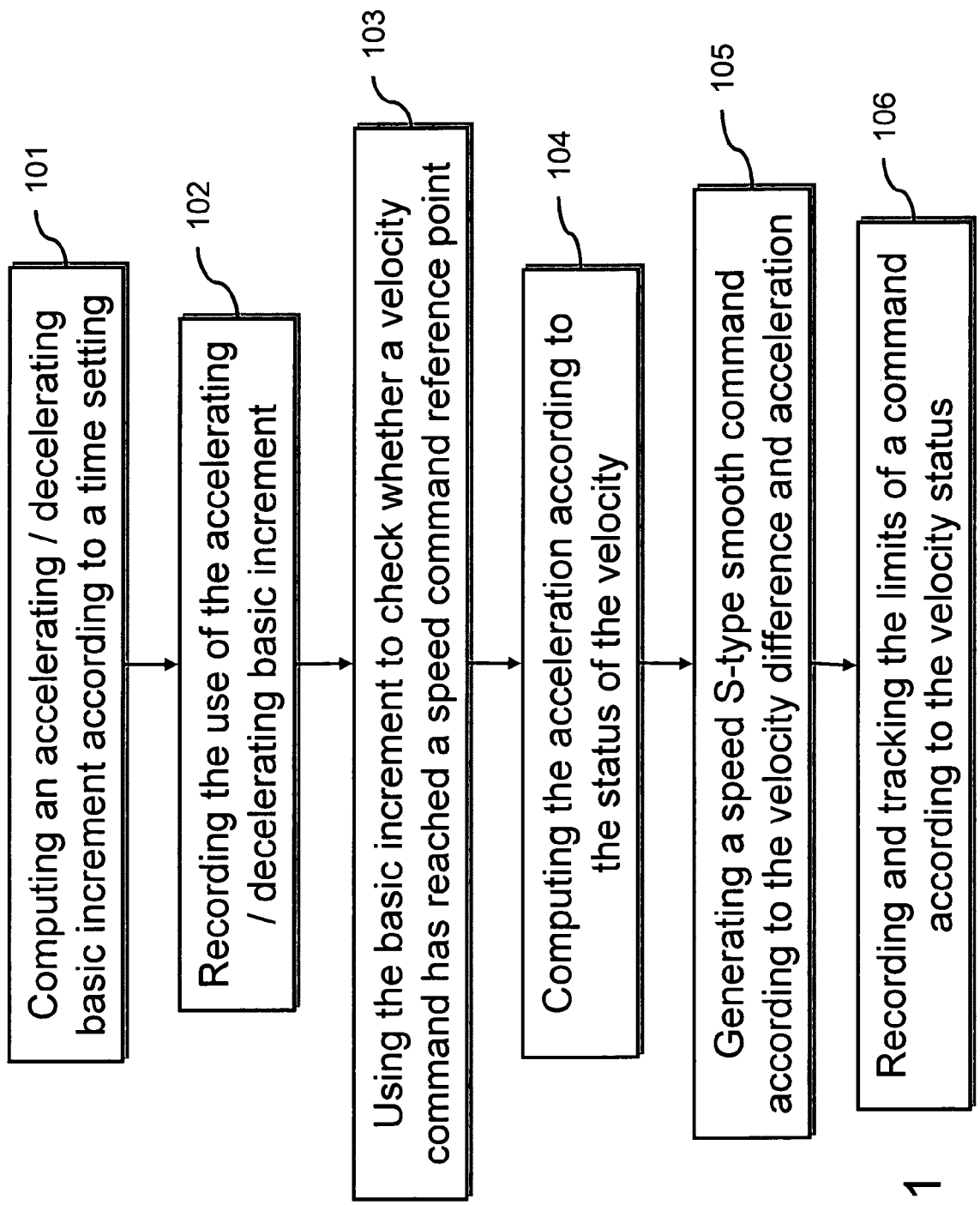
FIG. 1 is a main flowchart of the disclosed velocity S-type smooth command generating method.

In the following, we describe how the disclosed method generates a velocity S-type smooth command and a position S-type smooth command. FIG. 1 is the main flowchart of the disclosed velocity S-type smooth command method.

Figure 2:
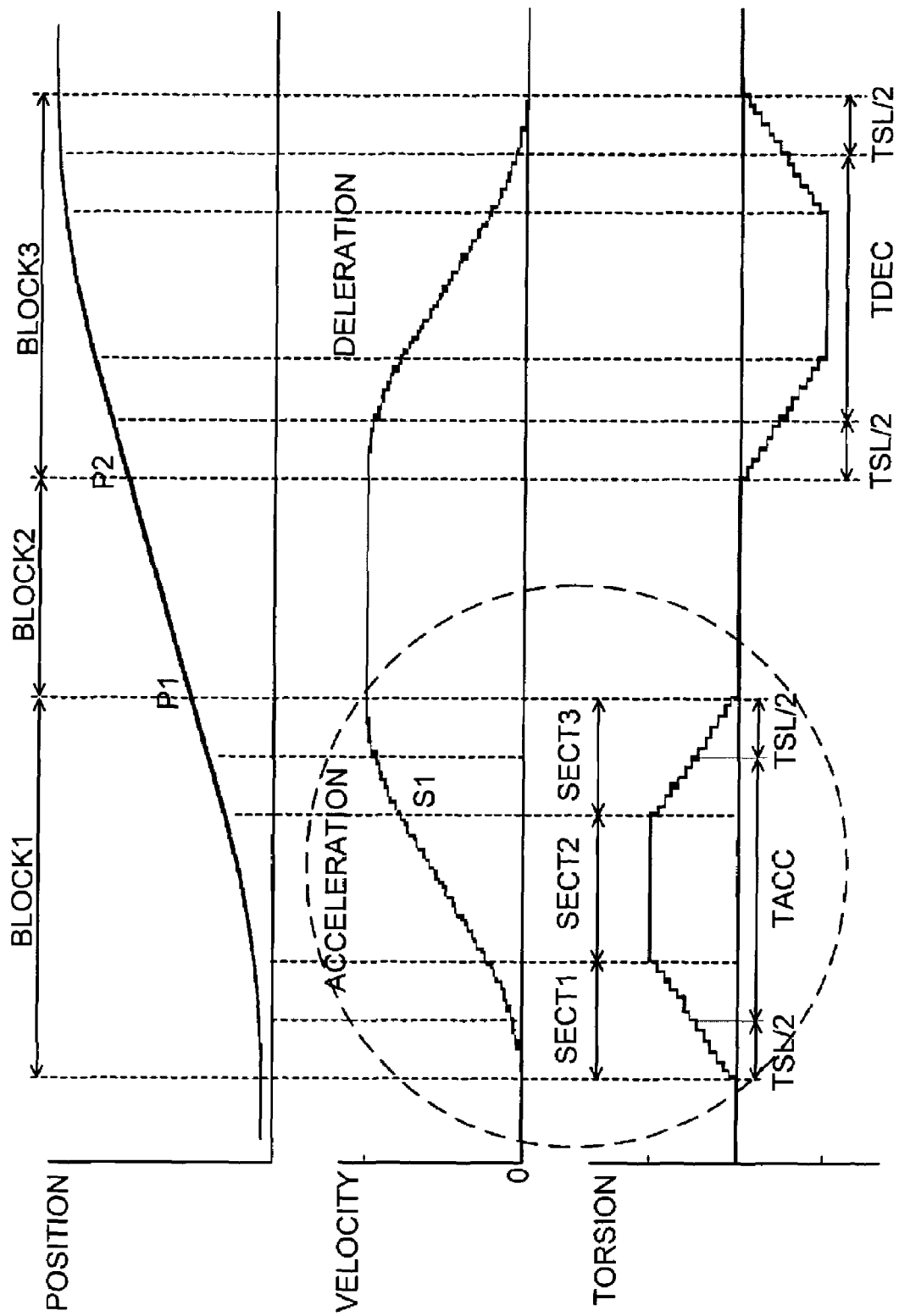
FIG. 2 is a structure of the disclosed position and velocity S-type smooth command generating means.

In order to explain the structure of the command generating means, we define a time and a command reference point in FIG. 2. The part enclosed by the circular dashed line is the structure of the velocity S-type smooth command generating method. The velocity command is generated according to the acceleration. TACC in the drawing is the acceleration time constant. TDEC is the deceleration time constant. TSL is the smooth time constant. S1 is a first velocity command reference point. P1 and P2 are the first and second position command reference points, respectively.

According to the flowchart in FIG. 1, the method first performs a command preprocess to compute acceleration and deceleration basic increments according to the time setting (step 101). It then records the status of using the acceleration and deceleration basic increments (step 102). The method checks whether the velocity command has reaches the velocity command reference point (step 103) and computes the acceleration (step 104), thereby generating a velocity S-type smooth command (step 105). Finally, the method records and tracks the limits of a command according to the velocity status and restricts the smooth curve commands (step 106).

In steps 101 and 102, the velocity S-type smooth command is generated according to the following principles. The acceleration/deceleration is determined by the motor velocity status. It uses the acceleration basic increment during acceleration and deceleration basic increment during deceleration. The acceleration basic increment is TACC/TSL, and the deceleration basic increment is TDEC/TSL. When the acceleration has a positive or negative sign, there is only one reference basic increment; otherwise, the S-type smooth curve cannot converge.

The method further checks whether the velocity command has reached the velocity command reference point (step 103), such as the first reference point S1 in FIG. 2. The checking is done by comparing the velocity with a predetermined value, which is the difference between a target value and a relative value. The relative value is half the product of the acceleration and a counting value. The counting value is increasing in the SECT1 region (increasing acceleration region), decreasing in the SECT3 region (decreasing acceleration region), and constant in the SECT2 region (fixed acceleration region). The counting value has a range between−TSL and TSL.

Afterwards, the method performs an acceleration calculation (step 104). When the velocity status is acceleration, the method uses the acceleration basic increment for computations. When the velocity status is deceleration, the method uses the deceleration basic increment for computations. The acceleration is increasing in the SECT1 region and decreasing in the SECT3 region. The region is determined according to the size of the counting value. If it is greater than TSL, the processing procedure enters the SECT2 region. When the velocity command reaches the command reference point S1, the processing procedure enters the SECT3 region.

After obtaining the acceleration in step 104, a velocity S-type smooth command is generated (step 105). If the obtained velocity difference is smaller than the acceleration and the acceleration is smaller than the acceleration basic increment or deceleration basic increment, the S-type smooth command is the velocity input command. When the velocity difference is greater than the acceleration, the S-type smooth command is the sum of the previous velocity command and the acceleration.

Finally, the method records and tracks the limits of a command according to the velocity status and restricts the smooth curve command (step 106). The velocity command is thus restricted within a specific range.

Figure 3:
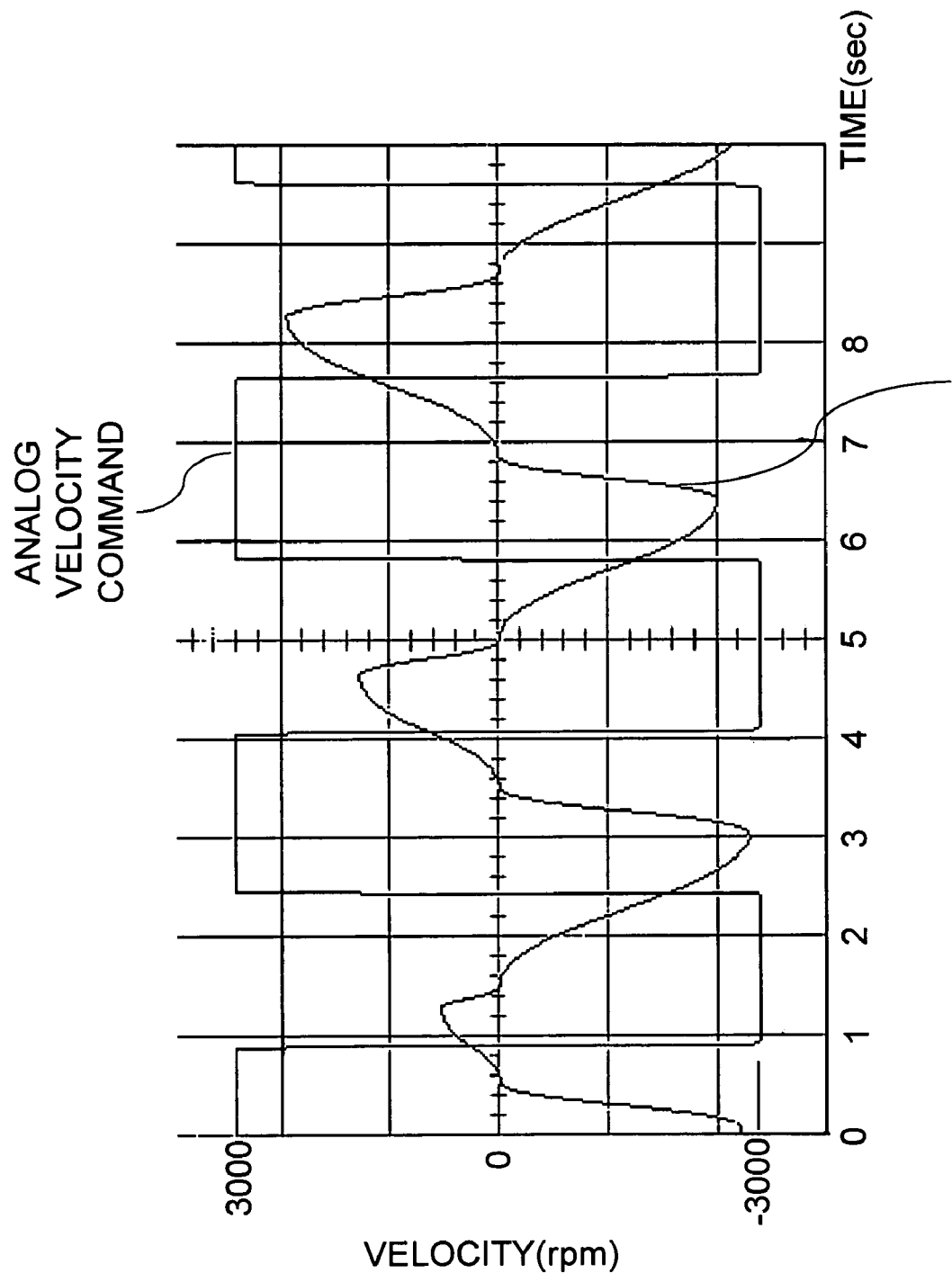
FIG. 3 shows the actual operation results of the disclosed velocity S-type smooth command generating method.

The actual operation results of the velocity S-type smooth command generating method are shown in FIG. 3. It shows the actual response of an analog velocity S-type smooth curve in a dynamical process. The analog velocity command is a voltage input signal. The motor rotation velocity is the response velocity after entering the velocity S-type command.

Figure 4:
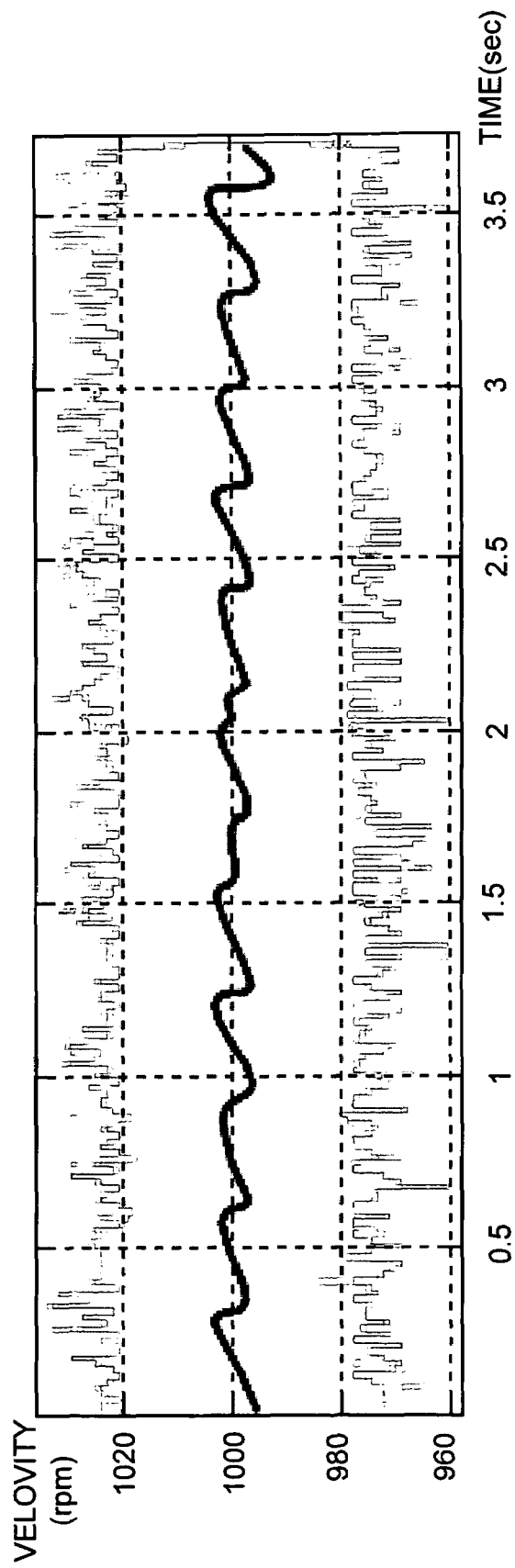
FIG. 4 is a simulation plot of the velocity command in the unsteady state.

As shown in FIG. 4, when there are noises in the input voltage, the velocity S-type smooth command generated by the invention has oscillations. The larger the noises are, the larger the oscillation amplitude is. One can insert a filter before the smooth command generating means according to the power supply quality. The steady velocity changes with the adjustments in the acceleration time constant and the deceleration time constant. One can improve the situation by adjusting a smooth time constant.

Figure 5:
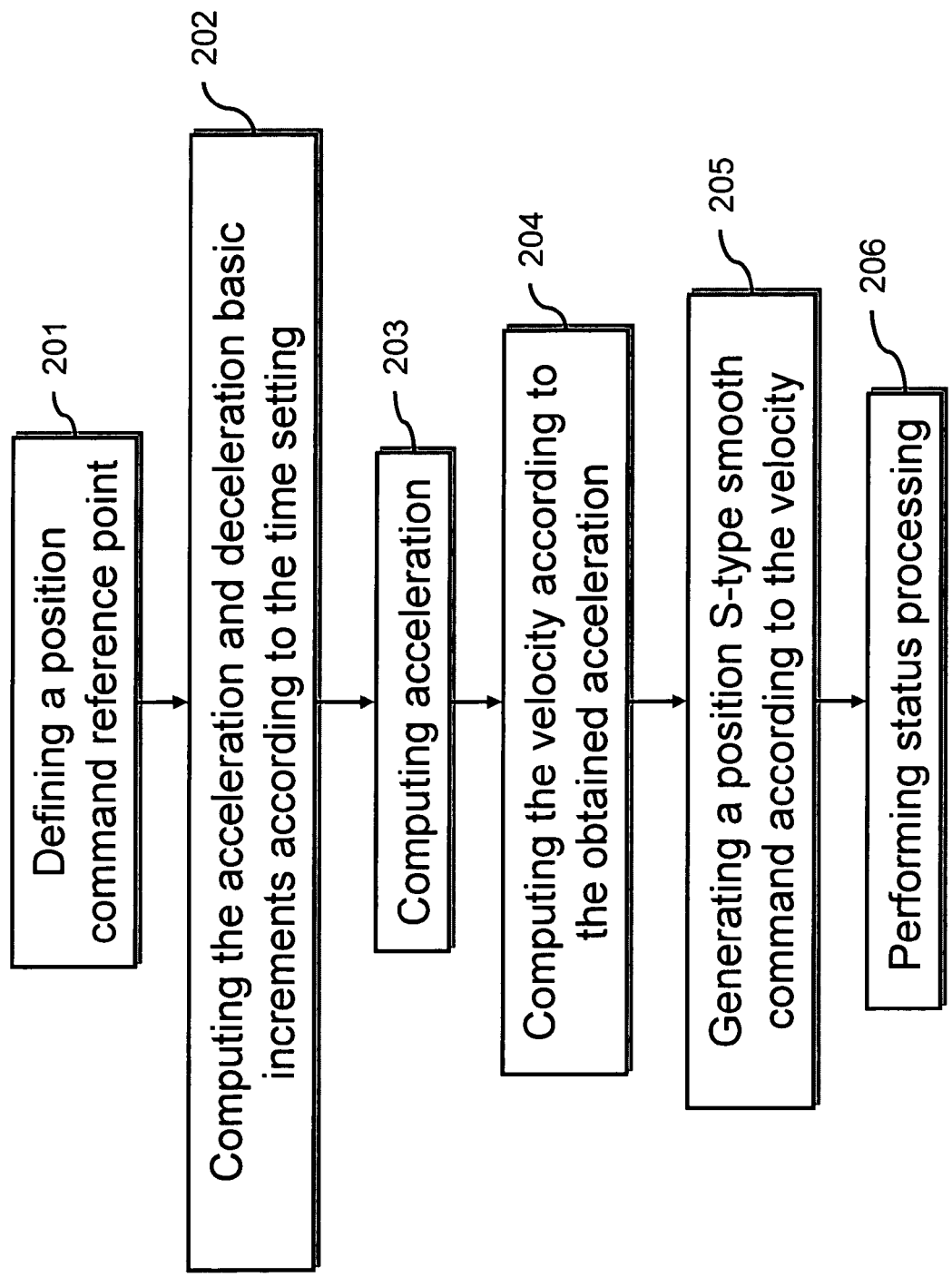
FIG. 5 is a main flowchart of the disclosed position S-type smooth command generating method.

In the following, we explains the generating procedure for the position S-type smooth commands with simultaneous reference to the main flowchart shown in FIG. 5. During the generating procedure of a position S-type smooth command, the acceleration/deceleration is determined by the motor position status. When the motor's position moves toward the position direction, it is accelerating. That is, the acceleration basic increment is used in both the BLOCK1 region and the BLOCK3 region in FIG. 2. When the motor's position moves toward in the negative direction, it is decelerating. The deceleration basic increment is used in both the BLOCK1 region and the BLOCK3 region in FIG. 2.

The method of generating the acceleration and the velocity in the BLOCK1 and BLOCK3 regions is the same as that of the velocity S-type smooth curve command.

First, the method defines a position command reference point (step 201). Take the motion in the positive direction as an example. The method computes the acceleration and deceleration basic increments according to the time setting (step 202). Afterwards, the acceleration is computed (step 203). When the position is in the BLOCK1 or BLOCK3 region, the acceleration status determines whether it is in SECT1, SECT2, or SECT3 region.

We use the acceleration basic increment for calculations during acceleration and the deceleration basic increment for calculations during deceleration. If the position is in the BLOCK3 region, the acceleration is decreasing in the SECT1 region and increasing in the SECT3 region.

Afterwards, the velocity is computed according to the obtained acceleration (step 204). The velocity is the sum of the previous velocity and the acceleration. Finally, the position S-type smooth command is generated according to the velocity to be sum of the previous S-type smooth command and the velocity (step 205).

The method then performs a status processing (step 206). It computes the velocity command reference point S1 by referring to the maximal moving velocity PMV. When the position reaches the position command reference point P1, the method computes the position command reference point P2, the difference between the a target value and the position command reference point P1. After the position reaches the position command reference point P2, the processing procedure enters the BLOCK3 region. The acceleration processing status is recorded, determining whether it is in which of the SECT1, SECT2, and SECT3 regions.

According to the invention, the S-type smooth command generating method and the means thereof adopt a symmetric structure and reference point processing, thereby constructing three classes of S-type smooth command generating methods and means. A post acceleration/deceleration structure is used to build a buffer position S-type smooth command generating method and the means thereof inside the servo driver. Therefore, the velocity and acceleration of the analog and buffer velocity S-type smooth command generating method and the means thereof are continuous. Those of the position S-type smooth command generating method and the means thereof are also continuous.

Besides, the S-type smooth command finishes the time setting, avoiding any motion command delay. This improves the properties of a T-type command generating means in the analog velocity mode. By adjusting the smooth time constant, the motor steady velocity does not vary too much because of changes in the acceleration time constant and the deceleration time constant.

The invention provides a complete and non-simplified command processing unit in a servo driver. The provided functions include a buffer velocity S-type smooth command generating device, an analog velocity S-type smooth command generating device, and a buffer position S-type smooth command generating device. With the multiple command processing modes, the servo driver can provide a complete set of solutions even without the support of an upper-level controller.

It will be apparent to the person skilled in the art that the invention as described above may be varied in many ways, and notwithstanding remaining within the spirit and scope of the invention as defined in the following claims.

What is claimed is:

1. A velocity S-type smooth command generating method, comprising the steps of:
  computing an accelerating/decelerating basic increment according to a time setting;
  recording the use of the accelerating/decelerating basic increment;
  using the basic increment to check whether a velocity command has reached a velocity command reference point, the velocity command reference point being set where an acceleration reaches a maximum;
  performing an acceleration computation according to a velocity command status after the velocity command reaches the velocity command reference point to generate the acceleration; and
  generating a velocity S-type smooth command according to a velocity difference of the velocity command and the acceleration;
  wherein the step of checking whether a velocity command has reached a velocity command reference point includes the step of determining whether the velocity is greater than a predetermined value, where the predetermined value is a difference between a target value which the velocity command is going to reach and a relative value, the relative value being half the product of the acceleration and a counting value.

2. The method of claim 1, wherein the step of computing the acceleration uses the acceleration basic increment when the velocity status is acceleration and the deceleration basic increment when the velocity status is deceleration.

3. The method of claim 1, wherein the S-type smooth command is an input velocity command the velocity difference is smaller than the acceleration as well as the acceleration is smaller than the acceleration/deceleration basic increment and the S-type smooth command is a sum of its previous velocity command and the acceleration when the velocity difference is greater than the acceleration in the step of generating a velocity S-type smooth command.

4. The method of claim 1 further comprises a step of recording and tracking limits of the command according to the velocity command status.

5. A position S-type smooth command generating method, comprising the steps of:
  defining a plurality of position command reference points;
  computing an accelerating/decelerating basic increment;
  performing an acceleration computation according to the accelerating/decelerating basic increment;
  performing a velocity computation according to the obtain acceleration;
  generating a position S-type smooth command according to the velocity; and
  performing a status processing according to the position S-type smooth command and position command reference points;
  wherein the step of performing a status processing further comprises the steps of:
    computing a velocity command reference point by referring to a maximal moving velocity;
    computing a second position command reference point according to a difference between a target value which the velocity command is going to reach and the first position command reference point after the position reaches a first position command reference point; and
    recording an acceleration processing status when the position reaches the second position command reference point.

6. A position S-type smooth command generating means, comprising:
  means for defining a plurality of position command reference points;
  means for computing an accelerating/decelerating basic increment;

means for performing an acceleration computation according to the accelerating/decelerating basic increment;

means for performing a velocity computation according to the obtained acceleration;

means for generating a position S-type smooth command according to the velocity; and means for performing a status processing according to the position S-type smooth command and position command reference points;

wherein the device that performs a status processing further includes:

means for computing a velocity command reference point by referring to a maximal moving velocity;

means for computing a second position command reference point according to a difference between a target value which the velocity command is going to reach and the first position command reference point after the position reaches a first position command reference point; and means for recording an acceleration processing status when the position reaches the second position command reference point.

7. A velocity S-type smooth command generating method, comprising the steps of:

computing an accelerating/decelerating basic increment according to a time setting;

recording the use of the accelerating/decelerating basic increment;

using the basic increment to check whether a velocity command has reached a velocity command reference point, the velocity command reference point being set where an acceleration reaches a maximum;

performing an acceleration computation according to a velocity command status after the velocity command reaches the velocity command reference point to generate the acceleration; and generating a velocity S-type smooth command according to a velocity difference of the velocity command and the acceleration;

wherein the S-type smooth command is an input velocity when the velocity difference is smaller than the acceleration as well as the acceleration is smaller than the acceleration/deceleration basic increment and the S-type smooth command is a sum of its previous velocity command and the acceleration when the velocity difference is greater than the acceleration in the step of generating a velocity S-type smooth command.

8. The method of claim 7, wherein the step of computing the acceleration uses the acceleration basic increment when the velocity status is acceleration and the deceleration basic increment when the velocity status is deceleration.

9. The method of claim 7, further comprises a step of recording and tracking limits of the command according to the velocity command status.

* * * * *